United States Patent
Yamauchi et al.

(10) Patent No.: US 9,206,286 B2
(45) Date of Patent: Dec. 8, 2015

(54) METHOD FOR PRODUCING POLYESTER RESIN

(71) Applicant: MITSUBISHI GAS CHEMICAL COMPANY, INC., Tokyo (JP)

(72) Inventors: Tatsuya Yamauchi, Niigata (JP); Junichi Edahiro, Niigata (JP); Yasuhiro Kushida, Niigata (JP); Takami Morishita, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/402,907

(22) PCT Filed: May 30, 2013

(86) PCT No.: PCT/JP2013/065030
§ 371 (c)(1),
(2) Date: Nov. 21, 2014

(87) PCT Pub. No.: WO2013/180215
PCT Pub. Date: Dec. 5, 2013

(65) Prior Publication Data
US 2015/0141614 A1     May 21, 2015

(30) Foreign Application Priority Data
May 30, 2012  (JP) .................. 2012-123137

(51) Int. Cl.
*C08G 63/78* (2006.01)
*C08G 63/672* (2006.01)
*C08G 63/685* (2006.01)

(52) U.S. Cl.
CPC ............. *C08G 63/78* (2013.01); *C08G 63/672* (2013.01); *C08G 63/6854* (2013.01)

(58) Field of Classification Search
CPC ........................ C08G 63/6854; C08G 63/78
USPC ........................................ 528/45, 272, 300
See application file for complete search history.

(56) References Cited

U.S. PATENT DOCUMENTS

| | | | |
|---|---|---|---|
| 2,945,008 A | 7/1960 | Caldwell et al. | |
| 4,110,316 A | 8/1978 | Edging et al. | |
| 5,635,590 A | 6/1997 | Rink et al. | |
| 6,927,275 B2 | 8/2005 | Hirokane et al. | |
| 2003/0100702 A1 | 5/2003 | Hirokane et al. | |
| 2005/0176914 A1 | 8/2005 | Hirokane et al. | |
| 2005/0209435 A1* | 9/2005 | Hirokane et al. | 528/272 |
| 2014/0364547 A1* | 12/2014 | Iwasaki et al. | 524/127 |

FOREIGN PATENT DOCUMENTS

| | | |
|---|---|---|
| CN | 1116854 | 2/1996 |
| CN | 1418903 | 5/2003 |
| CN | 1495217 | 5/2004 |
| CN | 1654507 | 8/2005 |
| CN | 1673248 | 9/2005 |
| JP | 53-128697 | 11/1978 |
| JP | 54-83995 | 7/1979 |
| JP | 55-56120 | 4/1980 |
| JP | 60-163918 | 8/1985 |
| JP | 03-014345 | 2/1991 |
| JP | 03-130425 | 6/1991 |
| JP | 04-088078 | 3/1992 |
| JP | 04-022954 | 4/1992 |
| JP | 05-069151 | 9/1993 |
| JP | 06-029396 | 4/1994 |
| JP | 07-013128 | 2/1995 |
| JP | 08-104742 | 4/1996 |
| JP | 09-040762 | 2/1997 |
| JP | 2971942 | 11/1999 |
| JP | 2000-344939 | 12/2000 |
| JP | 2009-179696 | 8/2009 |
| JP | 2011-99046 | 5/2011 |
| JP | 2011-219667 | 11/2011 |

OTHER PUBLICATIONS

Search report from PCT/JP2013/065030, mail date is Jul. 9, 2013.

* cited by examiner

*Primary Examiner* — Gregory Listvoyb
(74) *Attorney, Agent, or Firm* — Greenblum & Bernstein, P.L.C.

(57) ABSTRACT

The present invention provides a method for producing a polyester resin comprising dicarboxylic acid units and diol units, wherein at least a portion of the diol units is a diol unit having a cyclic acetal skeleton, the method comprising specific steps (1) to (4-2).

8 Claims, No Drawings

METHOD FOR PRODUCING POLYESTER RESIN

TECHNICAL FIELD

The present invention relates to a method for producing a polyester resin.

BACKGROUND ART

Polyethylene terephthalate (hereinafter, also referred to as PET) is excellent in transparency, mechanical performance, melt stability, solvent resistance, aroma retaining properties, and recycling efficiency. PET is therefore widely used as a material for films, sheets, hollow containers, and the like. Some of its properties, such as heat resistance, are however not sufficient. In this respect, attempts have been made, for example, to modify PET by copolymerization.

Examples of the modification by copolymerization include the modification of a polyester resin using a compound having a cyclic acetal skeleton. Specific examples of such a modified polyester resin include PET modified with a diol 3,9-bis(1,1-dimethyl-2-hydroxyethyl)-2,4,8,10-tetraoxaspiro[5.5]undecane (see e.g., Patent Literature 1). Another example thereof includes a polyester resin comprising terephthalic acid, 1,4-butanediol, and a diol having a cyclic acetal skeleton as monomers (see e.g., Patent Literature 2). Alternative examples thereof include a polyester resin comprising a diol having a cyclic acetal skeleton as a monomer (see e.g., Patent Literature 3).

Examples of cases using adhesion properties derived from an acetal bond include a polyester adhesive obtained from a diol having a cyclic acetal skeleton including 3,9-bis(1,1-dimethyl-2-hydroxyethyl)-2,4,8,10-tetraoxaspiro[5.5]undecane, and a dicarboxylic acid, and adhesive compositions and coating agents prepared by using the adhesive (see e.g., Patent Literatures 4, 5, 6, and 7). Examples of cases using a polyester resin obtained from a dicarboxylic acid and a diol having a cyclic acetal skeleton include polyester-based mixed filament yarns with different shrinkage, modified polyester films, biodegradable polyesters, toners for electrostatic development, and flame-retardant resin compositions (see e.g., Patent Literatures 8, 9, 10, 11, and 12).

Examples of general methods for producing polyester resins as described above include direct esterification and transesterification methods. The direct esterification method involves converting dicarboxylic acids to esters using diols in excessive amounts and polycondensing the esters under reduced pressure to form a polymer. The transesterification method involves transesterifying esters of dicarboxylic acids and alcohols, and diols in excessive amounts to form esters of dicarboxylic acids and diols and polycondensing the esters under reduced pressure to form a polymer.

CITATION LIST

Patent Literature

Patent Literature 1: U.S. Pat. No. 2,945,008
Patent Literature 2: Japanese Patent No. 2971942
Patent Literature 3: Japanese Patent Publication No. 07-013128
Patent Literature 4: Japanese Patent Publication No. 04-022954
Patent Literature 5: Japanese Patent Publication No. 05-069151
Patent Literature 6: Japanese Patent Publication No. 06-029396
Patent Literature 7: Japanese Patent Laid-Open No. 04-088078
Patent Literature 8: Japanese Patent Laid-Open No. 03-130425
Patent Literature 9: Japanese Patent Laid-Open No. 08-104742
Patent Literature 10: Japanese Patent Laid-Open No. 09-040762
Patent Literature 11: Japanese Patent Publication No. 03-014345
Patent Literature 12: Japanese Patent Laid-Open No. 2000-344939

SUMMARY OF INVENTION

Technical Problem

The direct esterification method using a diol having a cyclic acetal skeleton as a portion of starting material diols, however, has such problems that the obtained polyester resins have a considerably wide molecular weight distribution or have a gelled form, because the cyclic acetal skeleton is decomposed by carboxyl groups and water present in the reaction system. Such a polyester resin is therefore inferior in moldability, mechanical performance, etc.

In order to overcome such a problem, the direct esterification method for producing a polyester using a diol having a cyclic acetal skeleton as a portion of starting material diols involves subjecting an oligomer constituted by a diol having no cyclic acetal skeleton, a dicarboxylic acid, and/or ester-forming derivatives thereof to transesterification reaction with a diol having a cyclic acetal skeleton to introduce the diol having a cyclic acetal skeleton into the oligomer, followed by the polymerization of the oligomer in a polycondensation step.

The production of a polyester resin comprising a diol having a cyclic acetal skeleton as a portion of diol units is required to be a process comprising a transesterification reaction step and a polycondensation step for polymerization. Meanwhile, the transesterification reaction step and the polycondensation step, etc. may be performed while distillates of these reactions are recovered. These distillates contain a diol having no cyclic acetal skeleton. If the distillates can be recycled as a starting material in polyester production, the diol having no cyclic acetal skeleton can be effectively used.

The distillates of transesterification reaction, polycondensation reaction, etc., however, contain large amounts of impurities such as water or catalysts, in addition to the diol having no cyclic acetal skeleton. Due to a sublimable diol having a cyclic acetal skeleton, a portion of components that have not participated in the reaction contaminates a distillate. Entrained water or catalysts act on this diol having a cyclic acetal skeleton to thereby decompose the cyclic acetal skeleton. Many impurities derived from the resulting decomposition product are generated in the distillate. If this distillate is recycled directly as a polyester starting material, the resulting polyester resin has reduced properties.

For these reasons, the recycling of the distillates of transesterification reaction, polycondensation reaction, etc. requires purification operation such as distillation. The distillation alone, however, results in the sublimation of the diol having a cyclic acetal skeleton, which in turn contaminates the distillates. If such a contaminated distillate is recycled in polyester resin production, the resulting polyester resin has reduced properties. For these reasons, etc., a purified diol available as a polyester starting material is difficult to obtain by the distillation operation alone.

For example, Patent Literatures 1 to 12 described above have discussed to some extent the polyester resin itself or a method for producing a product using this polyester resin. Unfortunately, these literatures have not discussed the recovery of distillates, the recycling of purified distillates, etc. in the process of producing a polyester resin. Accordingly, the methods for producing a polyester resin as mentioned above provide low recycling efficiency, under the present circumstances. Thus, there has been a demand for the development of a method for producing a polyester resin which can achieve: the efficient purification of a distilled-off diol mixture (mixture containing a diol having no cyclic acetal skeleton and a diol having a cyclic acetal skeleton) in the process of producing a polyester resin using a diol having a cyclic acetal skeleton; the recycling of a purified diol as a starting material for a polyester resin; the production of a polyester resin having excellent properties; etc.

The present invention has been made in light of these situations, and an object of the present invention is to provide a method for producing a polyester resin which can efficiently purify diols in the reaction system and can further produce a polyester resin having excellent properties.

Solution to Problem

As a result of conducting diligent studies, the present inventors have found that the above object can be attained by a method for producing a polyester resin comprising a dicarboxylic acid unit and a diol unit, wherein at least a portion of the diol unit is a diol unit having a cyclic acetal skeleton, the production method comprising the steps of: reacting any one or more compounds selected from the group consisting of a dicarboxylic acid (G), a polyester resin comprising a dicarboxylic acid (G) and a diol (B) having no cyclic acetal skeleton, and a dicarboxylic acid dialkyl ester (E), with a diol (B) having no cyclic acetal skeleton to obtain a particular dihydroxyester (F); subjecting the dihydroxyester (F) to transesterification reaction with a diol (A) having a cyclic acetal skeleton to obtain an oligomer; polymerizing the oligomer; decomposing a distilled-off diol mixture (C) comprising the component (B) and/or the component (A) under a particular condition; and distilling the decomposed component (C) to obtain a purified diol (B1) comprising the component (B). On the basis of these findings, the present invention has been completed.

Specifically, the present invention is as described below.

[1]
A method for producing a polyester resin comprising a dicarboxylic acid unit and a diol unit, wherein at least a portion of the diol unit is a diol unit having a cyclic acetal skeleton, the method comprising the following steps (1) to (4-2): step (1) of reacting any one or more compounds selected from the group consisting of a dicarboxylic acid (G), a polyester resin comprising a dicarboxylic acid (G) and a diol (B) having no cyclic acetal skeleton, and a dicarboxylic acid dialkyl ester (E), with a diol (B) having no cyclic acetal skeleton to obtain a dihydroxyester (F) represented by the following formula (1);
step (2) of subjecting the dihydroxyester (F) to transesterification reaction with a diol (A) having a cyclic acetal skeleton to obtain an oligomer;
step (3) of polymerizing the oligomer;
step (4-1) of distilling off a diol mixture (C) comprising the component (B) and/or the component (A) in the step (2) and/or the step (3), and decomposing the component (C) under a pH condition of 10 or lower such that a concentration of the component (A) in the component (C) is 0.5% by mass or lower; and step (4-2) of distilling the component (C) after the step (4-1) to obtain a purified diol (B1) comprising the component (B):

[Formula 1]

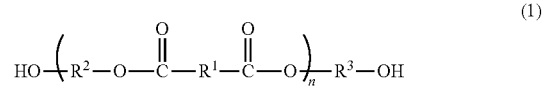

(wherein $R^1$, $R^2$, and $R^3$ each independently represent any divalent substituent selected from the group consisting of an aliphatic hydrocarbon group having 1 to 10 carbon atoms, an alicyclic hydrocarbon group having 3 to 10 carbon atoms, and an aromatic hydrocarbon group having 6 to 10 carbon atoms; and n is 1 or more and 200 or less.)

[2]
The method for producing the polyester resin according to [1], further comprising the following step (5):

step (5) of supplying the component (B1) to the step (1).

[3]
The method for producing the polyester resin according to [1] or [2], wherein the decomposition in the step (4-1) is heat treatment.

[4]
The method for producing the polyester resin according to [3], wherein the heat treatment is performed under a condition where the component (C) is kept at 80 to 250° C. for 1 to 20 hours.

[5]
The method for producing the polyester resin according to any one of [1] to [4], wherein $R^2$ and $R^3$ in the formula (1) each independently represent an aliphatic hydrocarbon group having 1 to 10 carbon atoms.

[6]
The method for producing the polyester resin according to any one of [1] to [5], wherein R in the formula (1) is a group derived from any compound selected from the group consisting of terephthalic acid, isophthalic acid, and 2,6-naphthalenedicarboxylic acid.

[7]
The method for producing the polyester resin according to any one of [1] to [6], wherein the diol unit having a cyclic acetal skeleton is a unit derived from any compound represented by the following formula (2):

[Formula 2]

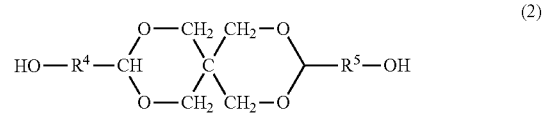

(wherein $R^4$ and $R^5$ each independently represent any divalent substituent selected from the group consisting of an aliphatic hydrocarbon group having 1 to 10 carbon atoms, an alicyclic hydrocarbon group having 3 to 10 carbon atoms, and an aromatic hydrocarbon group having 6 to 10 carbon atoms) or the following formula (3):

[Formula 3]

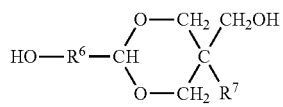

(3)

(wherein $R^6$ represents any divalent substituent selected from the group consisting of an aliphatic hydrocarbon group having 1 to 10 carbon atoms, an alicyclic hydrocarbon group having 3 to 10 carbon atoms, and an aromatic hydrocarbon group having 6 to 10 carbon atoms; and $R^7$ represents any monovalent substituent selected from the group consisting of an aliphatic hydrocarbon group having 1 to 10 carbon atoms, an alicyclic hydrocarbon group having 3 to 10 carbon atoms, and an aromatic hydrocarbon group having 6 to 10 carbon atoms.)

[8]

The method for producing the polyester resin according to [7], wherein the diol unit having a cyclic acetal skeleton is a unit derived from 3,9-bis(1,1-dimethyl-2-hydroxyethyl)-2,4,8,10-tetraoxaspiro[5.5]undecane or 5-methylol-5-ethyl-2-(1,1-dimethyl-2-hydroxyethyl)-1,3-dioxane.

Advantageous Effects of Invention

The present invention can provide a method for producing a polyester resin which can efficiently purify diols in the reaction system and can further produce a polyester resin having excellent properties.

DESCRIPTION OF EMBODIMENTS

Hereinafter, a mode for carrying out the present invention (hereinafter, simply referred to as the "present embodiment") will be described in detail. The present embodiment described below is provided merely for the purpose of illustrating the present invention and is not intended to limit the scope of the present invention by any means. The present invention may be carried out by appropriate change or modification without departing from the spirit thereof.

The production method of the present embodiment is a method for producing a polyester resin comprising a dicarboxylic acid unit and a diol unit, wherein at least a portion of the diol unit is a diol unit having a cyclic acetal skeleton, the method comprising the following steps (1) to (4-2):
step (1) of reacting any one or more compounds selected from the group consisting of a dicarboxylic acid (G), a polyester resin comprising a dicarboxylic acid (G) and a diol (B) having no cyclic acetal skeleton, and a dicarboxylic acid dialkyl ester (E), with a diol (B) having no cyclic acetal skeleton to obtain a dihydroxyester (F) represented by the following formula (1);
step (2) of subjecting the dihydroxyester (F) to transesterification reaction with a diol (A) having a cyclic acetal skeleton to obtain an oligomer;
step (3) of polymerizing the oligomer;
step (4-1) of distilling off a diol mixture (C) comprising the component (B) and/or the component (A) in the step (2) and/or the step (3), and decomposing the component (C) under a pH condition of 10 or lower such that a concentration of the component (A) in the component (C) is 0.5% by mass or lower; and
step (4-2) of distilling the component (C) after the step (4-1) to obtain a purified diol (B1) comprising the component (B):

[Formula 4]

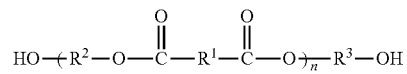

(1)

(wherein $R^1$, $R^2$, and $R^3$ each independently represent any divalent substituent selected from the group consisting of an aliphatic hydrocarbon group having 1 to 10 carbon atoms, an alicyclic hydrocarbon group having 3 to 10 carbon atoms, and an aromatic hydrocarbon group having 6 to 10 carbon atoms; and n is 1 or more and 200 or less.)

The step (1) is the step of reacting any one or more compounds with a diol (B) having no cyclic acetal skeleton to obtain a dihydroxyester (F) represented by the formula (1), wherein the one or more compounds are selected from the group consisting of a dicarboxylic acid (G), a polyester resin comprising a dicarboxylic acid (G) and a diol (B) having no cyclic acetal skeleton, and a dicarboxylic acid dialkyl ester (E).

Examples of the dicarboxylic acid (G) used in the step (1) include, but not particularly limited to: aliphatic dicarboxylic acids such as succinic acid, glutaric acid, adipic acid, pimelic acid, suberic acid, azelaic acid, sebacic acid, dodecanedicarboxylic acid, cyclohexanedicarboxylic acid, decanedicarboxylic acid, norbornanedicarboxylic acid, tricyclodecanedicarboxylic acid, and pentacyclododecanedicarboxylic acid; and aromatic dicarboxylic acids such as terephthalic acid, isophthalic acid, phthalic acid, 2-methylterephthalic acid, 1,4-naphthalenedicarboxylic acid, 1,5-naphthalenedicarboxylic acid, 2,6-naphthalenedicarboxylic acid, 2,7-naphthalenedicarboxylic acid, biphenyldicarboxylic acid, and tetralindicarboxylic acid. Among them, an aromatic dicarboxylic acid is preferred from the viewpoint of the mechanical performance or heat resistance of the resulting polyester resin, and terephthalic acid, 2,6-naphthalenedicarboxylic acid, or isophthalic acid is more preferred. Terephthalic acid is further preferred from the economic standpoint. These dicarboxylic acids may each be used alone or may be used in combination of two or more thereof.

Examples of the dicarboxylic acid dialkyl ester (E) used in the step (1) include, but not particularly limited to: methyl esters, ethyl esters, and propyl esters of aliphatic dicarboxylic acids such as succinic acid, glutaric acid, adipic acid, suberic acid, azelaic acid, sebacic acid, dodecanedicarboxylic acid, cyclohexanedicarboxylic acid, decanedicarboxylic acid, norbornanedicarboxylic acid, tricyclohexanedicarboxylic acid, and pentacyclododecanedicarboxylic acid; and methyl esters, ethyl esters, and propyl esters of aromatic dicarboxylic acids such as terephthalic acid, isophthalic acid, phthalic acid, 2-methylterephthalic acid, 1,4-naphthalenedicarboxylic acid, 1,5-naphthalenedicarboxylic acid, 2,6-naphthalenedicarboxylic acid, 2,7-naphthalenedicarboxylic acid, biphenyldicarboxylic acid, and tetralindicarboxylic acid. Among them, an aromatic dicarboxylic acid dimethyl ester is preferred from the viewpoint of the mechanical performance or heat resistance of the resulting polyester resin, and dimethyl terephthalate, 2,6-naphthalenedicarboxylic acid dimethyl ester, or dimethyl isophthalate is more preferred. Dimethyl terephthalate is further preferred from the economic standpoint. These dicarboxylic acid dialkyl esters may each be used alone or may be used in combination of two or more thereof.

Examples of the polyester resin comprising a dicarboxylic acid (G) and a diol (B) having no cyclic acetal skeleton, used in the step (1), include polyethylene terephthalate, polybutylene terephthalate, polyethylene naphthalate, isophthalic acid-modified polyethylene terephthalate, and 1,4-cyclohexanedimethanol-modified polyethylene terephthalate. Any of those mentioned above as specific examples of the dicarboxylic acid (G) may be used as the dicarboxylic acid (G) in this polyester resin. Any of those mentioned below as specific examples of the diol (B) having no cyclic acetal skeleton may be used as the diol (B) having no cyclic acetal skeleton in this polyester resin. The polyester resin is preferably polyethylene terephthalate.

Examples of the diol (B) having no cyclic acetal skeleton, used in the step (1), include, but not particularly limited to: aliphatic diols such as ethylene glycol, trimethylene glycol, 1,4-butanediol, 1,5-pentanediol, 1,6-hexanediol, diethylene glycol, propylene glycol, and neopentyl glycol; polyether compounds such as polyethylene glycol, polypropylene glycol, and polybutylene glycol; alicyclic diols such as 1,3-cyclohexanedimethanol, 1,4-cyclohexanedimethanol, 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetralindimethanol, norbornanedimethanol, tricyclodecanedimethanol, and pentacyclododecanedimethanol; bisphenols such as 4,4'-(1-methylethylidene)bisphenol, methylenebisphenol (bisphenol F), 4,4'-cyclohexylidenebisphenol (bisphenol Z), and 4,4'-sulfonylbisphenol (bisphenol S); alkylene oxide adducts of bisphenols; aromatic dihydroxy compounds such as hydroquinone, resorcin, 4,4'-dihydroxybiphenyl, 4,4'-dihydroxydiphenyl ether, and 4,4'-dihydroxydiphenylbenzophenone; and alkylene oxide adducts of aromatic dihydroxy compounds. Among them, ethylene glycol is preferred from the viewpoint of the mechanical performance of the resulting polyester resin, from the economic standpoint, etc. These diols may each be used alone or may be used in combination of two or more thereof. Alternatively, any of monocarboxylic acids such as benzoic acid, propionic acid, and acetic acid; monoalcohols such as butyl alcohol, hexyl alcohol, and octyl alcohol; trihydric or higher polyhydric alcohols such as trimethylolpropane, glycerin, and pentaerythritol; etc. may be used in combination therewith without impairing the object of the present embodiment.

The dihydroxyester (F) obtained in the step (1) is a compound represented by the following formula (1):

[Formula 5]

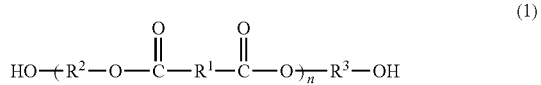

(1)

(wherein $R^1$, $R^2$, and $R^3$ each independently represent any divalent substituent selected from the group consisting of an aliphatic hydrocarbon group having 1 to 10 carbon atoms, an alicyclic hydrocarbon group having 3 to 10 carbon atoms, and an aromatic hydrocarbon group having 6 to 10 carbon atoms; and n is 1 or more and 200 or less.)

$R^1$ is a divalent substituent and is preferably an aromatic hydrocarbon group having 6 to 10 carbon atoms, more preferably a group derived from any compound selected from the group consisting of terephthalic acid, isophthalic acid, and 2,6-naphthalenedicarboxylic acid.

Each of $R^2$ and $R^3$ is a divalent substituent and is preferably an aliphatic hydrocarbon group having 1 to 10 carbon atoms, more preferably a group derived from any compound selected from the group consisting of ethylene glycol, 1,4-cyclohexanedimethanol, and tricyclodecanedimethanol.

Examples of the step (1) include: step (1-i) of reacting the dicarboxylic acid (G) with the diol (B) having no cyclic acetal skeleton to obtain a dihydroxyester (F1); step (1-ii) of reacting the polyester resin comprising a dicarboxylic acid (G) and a diol (B) having no cyclic acetal skeleton with the diol (B) having no cyclic acetal skeleton to obtain a dihydroxyester (F2); and step (1-iii) of reacting the dicarboxylic acid dialkyl ester (E) with the diol (B) having no cyclic acetal skeleton to obtain a dihydroxyester (F3).

The step (1-i) will be described.

Specific examples of the step (1-i) include the following methods: one of the methods is method (1-i-1) of subjecting the dicarboxylic acid (G) and the diol (B) having no cyclic acetal skeleton to esterification reaction, followed by polycondensation reaction to obtain a dihydroxyester (F1-1) having a predetermined average degree of polymerization. Another method is method (1-i-2) of subjecting the dicarboxylic acid (G) to esterification reaction with the diol (B) having no cyclic acetal skeleton, and subjecting the obtained polymer with a low degree of polymerization and/or a polymer with a high degree of polymerization obtained by the polycondensation reaction of this polymer with a low degree of polymerization (hereinafter, these polymers are collectively referred to as a dihydroxyester (F1-2')) to depolymerization reaction with the diol (B) having no cyclic acetal skeleton to obtain a dihydroxyester (F1-2). Among them, the method (1-i-2) is preferred from the viewpoint that this method can control properties such as the average degree of polymerization or melting point with high accuracy by way of the dihydroxyester (F1-2').

The average degree of polymerization used herein refers to a value determined by dividing a number-average molecular weight measured by gel permeation chromatography by the molecular weight of the repeat units in the dihydroxyester (F). The average degree of polymerization of the dihydroxyester (F1-1) is preferably 15 to 200.

In the method to obtain the dihydroxyester (F1-1), the charge ratio (molar ratio) of the diol (B) having no cyclic acetal skeleton to the dicarboxylic acid (G) is preferably 1.01 to 10, more preferably 1.1 to 5, further preferably 1.2 to 2. At the charge ratio that falls within the above range, unfavorable side reactions such as etherification reaction ascribable to the intermolecular dehydration of the diol (B) having no cyclic acetal skeleton can be suppressed.

In the method to obtain the dihydroxyester (F1-1), the pressure of the esterification reaction is preferably 10 to 500 kPa. In the method to obtain the dihydroxyester (F1-1), the reaction temperature of the esterification reaction is preferably 80 to 270° C., more preferably 100 to 260° C., further preferably 150 to 250° C.

In the method to obtain the dihydroxyester (F1-1), the esterification reaction may be performed in the absence of a catalyst or may be performed using a catalyst. In the case of using a catalyst, the amount of the catalyst used is preferably 0.0001 to 5% by mol with respect to the dicarboxylic acid (G).

A conventionally known catalyst can be used without particular limitations. Examples of the catalyst include: alkoxides of sodium, magnesium, or titanium; fatty acid salts, carbonates, phosphates, hydroxides, chlorides, and oxides of metals such as zinc, lead, cerium, cadmium, manganese, cobalt, lithium, sodium, potassium, calcium, nickel, magnesium, vanadium, aluminum, titanium, germanium, antimony, and tin; and metallic magnesium. These catalysts may each be used alone or may be used in combination of two or more thereof.

In the method to obtain the dihydroxyester (F1-1), the esterification reaction is performed until the reaction conversion rate of the dicarboxylic acid (G) reaches preferably 90% or more, more preferably 92% or more, further preferably 95% or more. The reaction conversion rate used herein refers to the ratio of the carboxyl groups of the dicarboxylic acid (G) bonded to the diol (B) having no cyclic acetal skeleton to all carboxyl groups in the dicarboxylic acids (G). In the method to obtain the dihydroxyester (F1-1), the reaction conversion rate that falls within the above range when the esterification reaction is stopped is preferred because the required time for the subsequent polycondensation reaction can be shortened.

In the method to obtain the dihydroxyester (F1-1), preferably, the temperature of the polycondensation reaction is gradually raised and finally set to 200 to 300° C. In the method to obtain the dihydroxyester (F1-1), preferably, the pressure of the polycondensation reaction is gradually reduced and finally set to 10 kPa or lower.

In the method to obtain the dihydroxyester (F1-1), the polycondensation reaction may be performed in the absence of a catalyst or may be performed using a catalyst. In the case of using a catalyst, the amount of the catalyst used is preferably 0.0001 to 5% by mol with respect to the dicarboxylic acid (G). Any of those exemplified above may be used as the catalyst. These catalysts may each be used alone or may be used in combination of two or more thereof.

The time at which the step (1-i) is completed can be determined on the basis of a molar ratio (b/a) of the molar quantity (b) of a free carboxyl group to the molar quantity (a) of the dicarboxylic acid unit in the dihydroxyester (F). Specifically, the reaction is preferably performed until the molar quantity a, the molar quantity b, and the expected molar quantity (c) of the diol (A) having a cyclic acetal skeleton used in the step (2) satisfy relationships represented by the expressions (I) and (II):

$$0 \leq (b/a) \times (c/a) \leq 0.003 \quad \text{(I)}$$

$$0 \leq (b/a) \leq 0.035 \quad \text{(II)}$$

On the other hand, in the method to obtain the dihydroxyester (F1-2), the dihydroxyester (F1-2') may be a polymer with a low degree of polymerization prepared by the esterification step in the method to obtain the dihydroxyester (F1-1) as described above or may be a polymer with a high degree of polymerization prepared by the polycondensation step following the esterification step. In this context, the polymer with a low degree of polymerization refers to a polymer obtained by the esterification step in conventional polyester resin production and has an average degree of polymerization of preferably 2 to 25. The polymer with a high degree of polymerization refers to a polymer obtained by the polycondensation step and has an average degree of polymerization of preferably 10 to 200. The average degree of polymerization of the dihydroxyester (F1-2') is preferably 2 to 200, more preferably 2 to 70, further preferably 2 to 25.

The average degree of polymerization of the dihydroxyester (F1-2) is preferably 2 or higher and lower than 15.

The melting point of the dihydroxyester (F1-2) is preferably 150 to 240° C., more preferably 150 to 240° C., further preferably 150 to 230° C., still further preferably 150 to 220° C. The melting point of the dihydroxyester (F1-2) that falls within the above range allows the step (2) to be performed at a low reaction temperature. As a result, the thermal decomposition of the diol (A) having a cyclic acetal skeleton can be further suppressed. In addition, unfavorable side reactions such as etherification reaction ascribable to the intermolecular dehydration of the diol (B) having no cyclic acetal skeleton can also be suppressed. The melting point can be determined by differential scanning calorimetry.

In the depolymerization reaction of the dihydroxyester (F1-2'), a ratio of the diol (B) having no cyclic acetal skeleton to the dicarboxylic acid unit in the dihydroxyester (F1-2') is preferably 0.1- to 10-fold mol, more preferably 0.3- to 5-fold mol, further preferably 0.5- to 3-fold mol.

The pressure of the depolymerization reaction of the dihydroxyester (F1-2') is preferably 50 to 500 kPa, more preferably 100 to 300 kPa. The temperature of the depolymerization reaction of the dihydroxyester (F1-2') is preferably 150 to 250° C., more preferably 180 to 230° C.

The depolymerization reaction of the dihydroxyester (F1-2') may be performed in the absence of a catalyst or may be performed using a catalyst. In the case of using a catalyst, the amount of the catalyst used is preferably 0.0001 to 5% by mol with respect to the dicarboxylic acid unit in the dihydroxyester (F1-2'). Any of those exemplified above in relation to the method to produce dihydroxyester (F1-1) can be used as the catalyst. These catalysts may each be used alone or may be used in combination of two or more thereof.

When a molar ratio of the diol unit to the dicarboxylic acid unit in the depolymerization product of the dihydroxyester (F1-2') is larger than 3.0, mainly the diol (B) having no cyclic acetal skeleton may be distilled off by heat treatment under conditions involving 150 to 250° C. and 0.5 to 100 kPa until this molar ratio becomes 3.0 or smaller. Even when the molar ratio of the diol unit to the dicarboxylic acid unit in the depolymerization product is 3.0 or smaller, mainly the diol (B) having no cyclic acetal skeleton can be distilled off under the above conditions in order to further decrease this molar ratio.

The molar ratio (diol unit/dicarboxylic acid unit) of the diol unit to the dicarboxylic acid unit in the dihydroxyester (F1-2) thus obtained is preferably 1.1 to 3.0, more preferably 1.1 to 2.0, further preferably 1.1 to 1.7, still further preferably 1.1 to 1.5. At the molar ratio of the diol unit to the dicarboxylic acid unit that falls within the above range, unfavorable side reactions such as etherification reaction ascribable to dehydration can be effectively suppressed in the subsequent step (2).

The depolymerization reaction of the dihydroxyester (F1-2') usually occurs concurrently with the esterification reaction of terminal carboxyl groups remaining in small amounts. Thus, the molar ratio (b/a) of the molar quantity (b) of a free carboxyl group to the molar quantity (a) of the dicarboxylic acid unit in the dihydroxyester (F1-2) obtained by depolymerization tends to be smaller than the molar ratio (b/a) of the dihydroxyester (F1-2'). Water generated by esterification during the depolymerization can be distilled off from the reaction system to thereby effectively reduce the molar ratio (b/a) of the dihydroxyester (F1-2).

In the step (1-i), orthoformic acid triester and/or carbonic acid diester can be added at a ratio of 0.01- to 0.2-fold mol with respect to the amount of the dicarboxylic acid (G) charged. The step (1-i) can be performed in the presence of the orthoformic acid triester or the carbonic acid diester to thereby further reduce the molar ratio (b/a) of the molar quantity (b) of a free carboxyl group in the dihydroxyester (F1) to the molar quantity (a) of the dicarboxylic acid unit.

Examples of the orthoformic acid triester include trimethyl orthoformate and triethyl orthoformate. Among them, trimethyl orthoformate is preferred.

Examples of the carbonic acid diester include dimethyl carbonate and diethyl carbonate. Among them, dimethyl carbonate is preferred.

The step (1-ii) will be described. The step (1-ii) is the step of reacting the polyester resin comprising a dicarboxylic acid (G) and a diol (B) having no cyclic acetal skeleton with the diol (B) having no cyclic acetal skeleton to obtain a dihydroxyester (F2). Specifically, this step differs from the step (1-i) mentioned above in that the step (1-i) employs the dicarboxylic acid (G) and the diol (B) having no cyclic acetal skeleton for obtaining the dihydroxyester (F1), whereas this step (1-ii) employs a polyester resin comprising the dicarboxylic acid (G) and the diol having no cyclic acetal skeleton. The conditions mentioned in relation to the step (1-i) can be appropriately adopted for the other procedures, unless otherwise specified.

Examples of the polyester resin comprising a dicarboxylic acid (G) and a diol (B) having no cyclic acetal skeleton, used in the step (1-ii), include polyethylene terephthalate, polybutylene terephthalate, polyethylene naphthalate, isophthalic acid-modified polyethylene terephthalate, and 1,4-cyclohexanedimethanol-modified polyethylene terephthalate.

The molar ratio (diol unit/dicarboxylic acid unit) of the diol unit to the dicarboxylic acid unit in the dihydroxyester (F2) is preferably 1.1 to 3.0, more preferably 1.1 to 2.0, further preferably 1.1 to 1.7, still further preferably 1.1 to 1.5. At the molar ratio of the diol unit to the dicarboxylic acid unit that falls within the above range, unfavorable side reactions such as etherification reaction ascribable to dehydration can be effectively suppressed in the subsequent step (2).

As in the step (1-i), in the step (1-ii), orthoformic acid triester and/or carbonic acid diester can be added at a ratio of 0.01- to 0.2-fold mol with respect to the amount of the dicarboxylic acid (G) charged. This can further reduce the molar ratio (b/a) of the molar quantity (b) of a free carboxyl group in the dihydroxyester (F2) to the molar quantity (a) of the dicarboxylic acid unit. The orthoformic acid triester and/or the carbonic acid diester may be added in the step (1) or may be added in any of the steps (2) and (3). Any of those exemplified in relation to the step (1-i) can be used as the orthoformic acid triester and the carbonic acid diester.

As in the step (1-i), the time at which the step (1-ii) is completed can be determined on the basis of the molar ratio (b/a) of the molar quantity (b) of a free carboxyl group to the molar quantity (a) of the dicarboxylic acid unit in the dihydroxyester (F). Specifically, the reaction is preferably performed until the molar quantity a, the molar quantity b, and the expected molar quantity (c) of the diol (A) having a cyclic acetal skeleton used in the step (2) satisfy relationships represented by the expressions (I) and (II):

$$0 \leq (b/a) \times (c/a) \leq 0.003 \quad (I)$$

$$0 \leq (b/a) \leq 0.035 \quad (II)$$

The step (1-iii) will be described.

The step (1-iii) is preferably the step of subjecting the dicarboxylic acid dialkyl ester (E) and the diol (B) having no cyclic acetal skeleton to transesterification reaction to obtain a dihydroxyalkyl ester (F3). The dihydroxyalkyl ester (F3) is, for example, a dihydroxyalkyl ester of a dicarboxylic acid, or a polymer thereof.

In the step (1-iii), the charge ratio (molar ratio) of the diol (B) having no cyclic acetal skeleton to the dicarboxylic acid dialkyl ester (E) is preferably 1.01 to 10, more preferably 1.3 to 6, further preferably 1.6 to 3.

The pressure of the reaction system in the step (1-iii) is preferably 10 to 500 kPa. The reaction temperature in the step (1-iii) is preferably 80 to 270° C., more preferably 100 to 240° C., further preferably 150 to 230° C.

The step (1-iii) may be performed in the absence of a catalyst or may be performed using a catalyst. In the case of using a catalyst, the amount of the catalyst used is preferably 0.0001 to 5% by mol with respect to the dicarboxylic acid dialkyl ester (E). Any of those exemplified in relation to the step (1-ii) can be used as the catalyst. These catalysts may each be used alone or may be used in combination of two or more thereof.

The step (1-iii) is performed until the reaction conversion rate of the dicarboxylic acid dialkyl ester (E) reaches preferably 85% by mol or higher, more preferably 88% by mol or higher, further preferably 90% by mol or higher. The reaction conversion rate used herein refers to the ratio of the carboxyl groups of the dicarboxylic acid dialkyl ester (E) bonded to the diol (B) having no cyclic acetal skeleton to all carboxyl groups in the dicarboxylic acid dialkyl esters (E). The reaction conversion rate that falls within the above range when the reaction in the step (1-iii) is stopped is preferred because an oligomer can be further polymerized in the subsequent step (3). The reaction conversion rate of the dicarboxylic acid dialkyl ester (E) is calculated from the amount of a generated alcohol.

The ratio of the diol unit to the dicarboxylic acid unit in the dihydroxyester (F3) is preferably 1.1- to 2.0-fold mol, more preferably 1.1- to 1.6-fold mol, further preferably 1.1- to 1.4-fold mol. For efficiently controlling the ratio of the diol unit to the dicarboxylic acid unit within the above range, for example, the diol (B) having no cyclic acetal skeleton is preferably distilled off from the reaction system under conditions involving 150 to 250° C. and 0.5 to 100 kPa in the step (1-iii). The diol (B) having no cyclic acetal skeleton is preferably distilled off after the reaction conversion rate of the dicarboxylic acid dialkyl ester (E) reaches 85% by mol or higher. At the ratio of the diol unit to the dicarboxylic acid unit that falls within the above range, unfavorable side reactions such as etherification reaction ascribable to the dehydration of diol components can be suppressed in the subsequent step (2).

The step (2) is the step of subjecting the dihydroxyester (F) obtained in the step (1) to transesterification reaction with a diol (A) having a cyclic acetal skeleton to obtain an oligomer.

Examples of the diol (A) having a cyclic acetal skeleton, used in the step (2), preferably include, but not particularly limited to, a compound represented by the following formula (2) or (3):

[Formula 6]

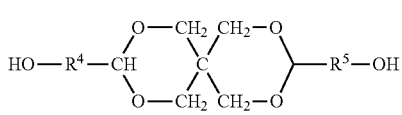

(wherein $R^4$ and $R^5$ each independently represent any divalent substituent selected from the group consisting of an aliphatic hydrocarbon group having 1 to 10 carbon atoms, an alicyclic hydrocarbon group having 3 to 10 carbon atoms, and an aromatic hydrocarbon group having 6 to 10 carbon atoms.)

[Formula 7]

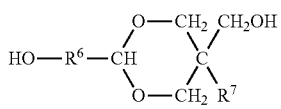

(3)

(wherein R represents any divalent substituent selected from the group consisting of an aliphatic hydrocarbon group having 1 to 10 carbon atoms, an alicyclic hydrocarbon group having 3 to 10 carbon atoms, and an aromatic hydrocarbon group having 6 to 10 carbon atoms;

and $R^7$ represents any monovalent substituent selected from the group consisting of an aliphatic hydrocarbon group having 1 to 10 carbon atoms, an alicyclic hydrocarbon group having 3 to 10 carbon atoms, and an aromatic hydrocarbon group having 6 to 10 carbon atoms.)

Each of $R^4$, $R^5$, and $R^6$ is independently a divalent substituent and is preferably an aliphatic hydrocarbon group having 1 to 10 carbon atoms, more preferably any one group selected from the group consisting of a methylene group, an ethylene group, a propylene group, an isopropylene group, a butylene group, and an isobutylene group. $R^7$ is a monovalent substituent and is preferably an aliphatic hydrocarbon group having 1 to 10 carbon atoms, more preferably any one group selected from the group consisting of a methyl group, an ethyl group, a propyl group, an isopropyl group, a butyl group, and an isobutyl group.

As a specific example, the compound represented by the formula (2) is preferably 3,9-bis(1,1-dimethyl-2-hydroxyethyl)-2,4,8,10-tetraoxaspiro[5.5]undecane. As a specific example, the compound represented by the formula (3) is more preferably 5-methylol-5-ethyl-2-(1,1-dimethyl-2-hydroxyethyl)-1,3-dioxane.

In the step (2), the diol (B) having no cyclic acetal skeleton, generated by the transesterification reaction of the dihydroxyester (F) with the diol (A) having a cyclic acetal skeleton, is preferably distilled off from the reaction system. This further promotes the transesterification reaction of the dihydroxyester (F) with the diol (A) having a cyclic acetal skeleton. The diol (B) having no cyclic acetal skeleton is preferably distilled off from the reaction system until the ratio of the amount of the diol unit having no cyclic acetal skeleton to the amount of the dicarboxylic acid unit in the oligomer reaches preferably 1.1- to 2.0-fold mol, more preferably 1.1- to 1.6-fold mol, further preferably 1.1- to 1.4-fold mol. At the ratio of the amount of the diol unit having a cyclic acetal skeleton to the amount of the dicarboxylic acid unit in the oligomer that falls within the above range, the diol (A) having a cyclic acetal skeleton can be prevented from being distilled off from the reaction system along with the distilling off of the diol (B) having no cyclic acetal skeleton from the reaction system.

The step (2) is performed until the rate of the transesterification reaction of the dihydroxyester (F) with the diol (A) having a cyclic acetal skeleton reaches preferably 50% by mol or higher, more preferably 70% by mol or higher, further preferably 90% by mol or higher. The rate of the reaction used herein refers to the ratio of the amount of the diol unit (A) having a cyclic acetal skeleton to the amount of the dicarboxylic acid unit in the oligomer. This rate of the reaction can be determined by nuclear magnetic resonance spectroscopy ($^1$H-NMR).

Preferably, the step (2) simultaneously satisfies the following conditions [1] to [4]:
condition [1] where molar ratio (b/a) of the molar quantity (b) of a free carboxyl group to the molar quantity (a) of the dicarboxylic acid unit in the dihydroxyester (F) is 0 to 0.035;
condition [2] where the charge ratio (molar ratio) (c/a) of the molar quantity (c) of the diol (A) having a cyclic acetal skeleton used to the molar quantity (a) of the dicarboxylic acid unit in the dihydroxyester (F) is 0.01 to 0.80;
condition [3] where the ratios (b/a) and (c/a) satisfy a relationship represented by the following expression (III):

$$0 \le (b/a) \times (c/a) \le 0.003 \qquad \text{(III); and}$$

condition [4] where the reaction system has a water concentration of 0.5% by mass or lower.

Hereinafter, each condition will be described.

The molar ratio (b/a) of the molar quantity (b) of a free carboxyl group to the molar quantity (a) of the dicarboxylic acid unit in the dihydroxyester (F) used in the step (2) is 0 to 0.035. This can prevent the decomposition of the diol (A) having a cyclic acetal skeleton by a free carboxyl group. This prevention of the decomposition of the diol (A) having a cyclic acetal skeleton allows a polyester resin to be produced without being gelled or drastically increasing its molecular weight distribution. Such a polyester resin that is not gelled and has a very small molecular weight distribution is excellent in mechanical performance and is also excellent in moldability, secondary workability, etc. (however, the effects of the present embodiment are not limited to them). From such a viewpoint, the molar ratio (b/a) is more preferably 0 to 0.020, further preferably 0 to 0.010.

The charge ratio (c/a; molar ratio) of the molar quantity (c) of the diol (A) having a cyclic acetal skeleton used to the molar quantity (a) of the dicarboxylic acid unit in the dihydroxyester (F) in the step (2) is 0.01 to 0.80. This facilitates the control of the copolymerization rate of the diol (A) having a cyclic acetal skeleton for a polyester resin within the range of 1 to 80% by mol. The resulting polyester resin is excellent in properties including transparency, mechanical performance, and heat resistance. The copolymerization rate used herein refers to the ratio of the amount of the diol unit (A) having a cyclic acetal skeleton to the amount of the dicarboxylic acid unit in the polyester resin. From such a viewpoint, the charge ratio (c/a) is more preferably 0.05 to 0.70, further preferably 0.10 to 0.60.

In the step (2), the obtained oligomer having a higher abundance ratio of the diol (A) having a cyclic acetal skeleton tends to be more easily decomposed by a free carboxyl group in the dihydroxyester (F). Also from such a viewpoint, the above ratios (b/a) and (c/a) preferably satisfy a relationship represented by the following expression (III):

$$0 \le (b/a) \times (c/a) \le 0.003 \qquad \text{(III)}$$

The product of (b/a) and (c/a) is more preferably 0 to 0.0025, further preferably 0 to 0.0020, still preferably 0 to 0.0015. At the product of (b/a) and (c/a) that falls within the above range, the decomposition of the diol (A) having a cyclic acetal skeleton can be effectively suppressed. As a result, a polyester resin having excellent properties can be efficiently produced.

The reaction system has a water concentration of 0.5% by mass or lower. This can effectively prevent the decomposition of the diol (A) having a cyclic acetal skeleton by water during the reaction in the step (2). From such a viewpoint, the water concentration of the reaction system is more preferably 0.3% by mass or lower, further preferably 0.1% by mass or lower.

The step (2) may be performed in the absence of a catalyst or may be performed using a catalyst. In the case of using a catalyst, the amount of the catalyst used is preferably 0.0001 to 5% by mol with respect to the dicarboxylic acid unit in the oligomer. Any of those exemplified in relation to the step (1-i) may be used as the catalyst. These catalysts may each be used alone or may be used in combination of two or more thereof.

The pressure of the reaction system in the step (2) is preferably 10 to 500 kPa. The reaction temperature in the step (2) is more preferably 80 to 240° C., further preferably 100 to 235° C., still preferably 150 to 230° C.

In the present embodiment, one or more compounds selected from the group consisting of the dihydroxyester (F1), the dihydroxyester (F2), and the dihydroxyester (F3) can be used as the dihydroxyester (F). For example, two or more dihydroxyesters may be used in combination as the dihydroxyester (F). For example, a mixture containing the dihydroxyester (F1), the dihydroxyester (F2), and the dihydroxyester (F3) preferably satisfies a condition where the molar ratio (b/a) of the molar quantity (b) of a free carboxyl group to the molar quantity (a) of the dicarboxylic acid unit in the mixture is 0 to 0.035, and a condition where the molar quantity a, the molar quantity b, and the expected molar quantity (c) of the diol (A) having a cyclic acetal skeleton used satisfy a relationship represented by the following expression (III):

$$0 \leq (b/a) \times (c/a) \leq 0.003 \tag{III}$$

The step (3) is the step of polymerizing the oligomer. The step (3) preferably involves polymerizing the oligomer obtained in the step (2), by polycondensation under reduced pressure. Preferably, the pressure of the reaction system in the step (3) is gradually reduced and finally set to 0.1 to 300 Pa. The final pressure set to 300 Pa or lower in the polycondensation reaction can sufficiently promote the reaction rate of the polycondensation reaction. Also, the final pressure set to 0.1 Pa or higher in the polycondensation reaction achieves excellent economy. Preferably, the temperature of the reaction system in the step (3) is gradually raised and finally set to 200 to 300° C.

The step (3) may be performed in the absence of a catalyst or may be performed using a catalyst. In the case of using a catalyst, the amount of the catalyst used is preferably 0.0001 to 5% by mol with respect to the dicarboxylic acid unit in the oligomer. Any of those exemplified in relation to the step (1-i) can be used as the catalyst. These catalysts may each be used alone or may be used in combination of two or more thereof.

In the method for producing a polyester resin according to the present embodiment, additives may be used, such as etherification inhibitors, various stabilizers (e.g., heat stabilizers), polymerization modifiers, light stabilizers, antistatic agents, lubricants, antioxidants, and mold release agents. Conventionally known additives may be used thereas.

Examples of the etherification inhibitors include amine compounds. Examples of the heat stabilizers include phosphoric acid, phosphorous acid, phenylphosphonic acid, phosphoric acid ester, and phosphorous acid ester. Examples of the polymerization modifiers include: aliphatic monoalcohols such as decanol and hexadecanol; aromatic monoalcohols such as benzyl alcohol; aliphatic monocarboxylic acids such as caproic acid, lauric acid, and stearic acid; and aromatic monocarboxylic acids such as benzoic acid. Examples of the light stabilizers include hindered amine light stabilizers, benzotriazole UV absorbers, and triazine UV absorbers. Examples of the antistatic agents include glycerin fatty acid ester monoglyceride and sorbitan fatty acid ester. Examples of the lubricants include aliphatic carboxylic acid ester, glycerin fatty acid ester, sorbitan fatty acid ester, and pentaerythritol fatty acid ester. Examples of the antioxidants include phenol antioxidants and phosphorous acid ester antioxidants. Examples of the mold release agents include aliphatic carboxylic acid ester, glycerin fatty acid ester, sorbitan fatty acid ester, and pentaerythritol fatty acid ester.

The molecular weight distribution (Mw/Mn) of the polyester resin that can be obtained by the production method of the present embodiment is preferably 2.5 to 12.0, more preferably 2.5 to 7.0, further preferably 2.5 to 5.0. The molecular weight distribution refers to the ratio (Mw/Mn) of a weight-average molecular weight to a number-average molecular weight and can be determined by gel permeation chromatography. In the present embodiment, the molecular weight distribution of the polyester resin can be minimized. Such a polyester resin having the minimal molecular weight distribution is excellent in mechanical properties and can also be used preferably as a polyester resin for a material of molding such as injection molding or extrusion molding.

The step (4-1) is the step of distilling off the diol mixture (C) comprising the component (B) and/or the component (A) in the step (2) and/or the step (3), and decomposing this component (C) under a pH condition of 10 or lower such that the concentration of the component (A) in the component (C) is 0.5% by mass or lower.

The diol mixture (C) can be decomposed so as to have a component (A) concentration of 0.5% by mass or lower to thereby improve the solubility in the diol (B) having no cyclic acetal skeleton and convert a component to low sublimable pentaerythritol, dioxanetriol, or the like. For example, a sublimable component (A) sublimates during distillation in the step (4-2) mentioned later to disadvantageously contaminate the purified diol (B1). Such a problem can be prevented by this approach.

Examples of the decomposition method include, but not particularly limited to, a method which involves keeping pH at a low value by the addition of an acid component to the diol mixture (C), and a method which involves performing heat treatment. Among them, heat treatment is preferred from the viewpoint that the heat treatment is convenient and the amount of heat can also be utilized in distillation in the step (4-2) mentioned later.

The heat treatment temperature in the step (4-1) is preferably 80 to 250° C., more preferably 100 to 220° C., further preferably 130 to 190° C.

The pressure of the heat treatment in the step (4-1) can be any of normal pressure, reduced pressure and increased pressure, and is preferably normal pressure.

The heat treatment time in the step (4-1) is preferably 0.5 to 20 hours, more preferably 1 to 20 hours, further preferably 1 to 18 hours, still further preferably 2 to 15 hours. The combination of the heating time and the pressure is preferably 80 to 250° C. for 1 to 20 hours, more preferably 100 to 220° C. for 1 to 18 hours, further preferably 130 to 190° C. for 2 to 15 hours.

Under each condition of the heat treatment that falls within the above range, the diol (A) having a cyclic acetal skeleton in the diol mixture (C) can be thermally decomposed efficiently. In addition, such a problem that, as described above, a sublimable component (A) sublimates during distillation in the step (4-2) mentioned later to contaminate the purified diol (B1), can also be prevented more effectively.

In the steps (1), (2), and (3), diol components are preferably distilled off from reaction products (reaction system) for promoting the reactions in the positive direction. In the step (4-1), at least the diol mixture (C) containing the diol distilled off in the step (2) and/or the diol distilled off in the step (3) may be decomposed. Thus, only the diol mixture (C) distilled off from the reaction product in any of the steps (2) and (3) may be decomposed; the diol mixtures (C) distilled off from the reaction products of the steps (2) and (3) may be decomposed; or the diol mixtures (C) distilled off from the reaction product of the step (2) and/or the step (3) as well as from the reaction product of the step (1) may be decomposed. In the present embodiment, preferably, the diol mixtures (C) distilled off from the reaction product of the step (2) and/or the step (3) as well as from the reaction product of the step (1) are decomposed from the viewpoint of recycling efficiency. Specifically, the diol mixture (C) comprising the component (B) and/or the component (A) is preferably distilled off from the reaction product not only in the step (2) and/or the step (3) but also in the step (1) and then decomposed. More preferably, the diol mixture (C) comprising the component (B) and/or the component (A) is distilled off from the reaction product in each of the steps (1), (2), and (3), and then decomposed.

As mentioned above, in the step (4-1), at least the diol mixture (C) distilled off from the reaction product of the step (2) and/or the step (3) may be decomposed. For example, prior to the step (4-1), the operation of distilling off the components corresponding to the diol mixture (C) from the reaction product of the step (2) and/or the step (3) is carried out, and the diol mixture (C) thus separated may be subjected to the decomposition treatment (step (4-1)). Alternatively, in the case of distilling off the diol mixture (C) from the reaction product of each of the steps (1), (2), and (3) and decomposing this diol mixture (C), for example, the components corresponding to the diol mixture (C) are distilled off from the reaction product of each of the steps (1), (2), and (3), and the components of these steps can be recovered and subjected to the decomposition treatment (step (4-1)).

As mentioned above, in preferred aspects of the steps (1), (2), and (3), the diol components (components corresponding to the diol mixture (C)) are appropriately distilled off from the reaction products to thereby promote the reactions in the positive direction. In this case, the diol components distilled off in these steps can be recovered and subjected as the diol mixture (C) to the decomposition treatment (Step (4-1)).

In addition, only the diol components to be recovered can be obtained conveniently as distillates under appropriately set distilling-off conditions (heating temperature, pressure, etc.). For example, the types of diol components as by-products can be predicted from the starting materials used in each step. Suitable distilling-off conditions can be appropriately set in consideration of properties such as the boiling points of the diol components. As a result, the diol mixture (C) can be conveniently obtained as a distillate.

An alkali component may be added in order to perform the decomposition treatment under a pH condition of 10 or lower in the step (4-1). Examples of the alkali component used include: alkali metal hydroxides such as sodium hydroxide and calcium hydroxide; alkali metal carbonates such as sodium carbonate; alkali metal bicarbonates such as sodium bicarbonate; and alkaline earth metals such as magnesium hydroxide.

The pH in the heat treatment is 10 or lower, preferably 7 or lower, further preferably 4 or lower. At the pH that falls within the above range, the diol (A) having a cyclic acetal skeleton, contained in the diol mixture (C), can be thermally decomposed efficiently. Such a problem that a sublimable component (A) sublimates during distillation in the step (4-2) mentioned later to contaminate the purified diol (B1) can also be prevented more effectively.

The step (4-2) is the step of distilling the component (C) after the step (4-1) to obtain a purified diol (B1) comprising the component (B).

The component (C) can be distilled to thereby remove a trace amount of impurities contained in the component (C) treated by the step (4-1). The obtained diol has higher purity. The distillation method is not particularly limited and may be any of batch and continuous supply methods. The distillation apparatus is not particularly limited, and, for example, a conventionally known distillation apparatus may be used.

The pressure at which the distillation is performed may be either normal pressure or reduced pressure and is preferably reduced pressure. The distillation can be performed under reduced pressure to thereby lower the boiling point of a trace amount of impurities to be removed. In addition, this distillation can be performed at a low temperature. Thus, unfavorable side reactions (e.g., etherification reaction ascribable to the intermolecular dehydration of the diol (B) having no cyclic acetal skeleton) can be further effectively suppressed. Specifically, the pressure at which the distillation is performed is preferably 1 to 80 kPa, more preferably 2 to 20 kPa. The distillation temperature is preferably 100 to 200° C., more preferably 110 to 170° C.

The proportion of the diol (B) having no cyclic acetal skeleton in the purified diol (B1) obtained by the step (4-2) is preferably 90.0% by mass or higher, more preferably 95.0% by mass or higher. The total sum of the content of an aldehyde derived from the diol (A) having a cyclic acetal skeleton and the content of an acetal component (B2) derived from the diol (B) having no cyclic acetal skeleton is preferably 8.0% by mass or lower in the purified diol (B1). The content of a diol (B3) generated by the intermolecular dehydration of the diol (B) having no cyclic acetal skeleton is preferably 3.0% by weight or lower in the purified diol (B1). At the proportion of each component that falls within the range in the purified diol (B1), this purified diol (B1) can be recycled as a starting material to yield a polyester resin excellent in mechanical performance.

Examples of the acetal component (B2) include (2-(1,1-dimethyl-2-hydroxyethyl)-1,3-dioxolane and 1,3-dioxolane, though differing depending on the starting materials used. Examples of the diol (B3) include diethylene glycol and triethylene glycol, though differing depending on the starting materials used.

Following the step (4-2), posttreatment may be performed, if necessary. The type of the posttreatment can be determined in consideration of the type of the purified diol (B1), its properties, and its use, etc. Examples of the posttreatment include filtration of insoluble matter, adsorption of residual impurities, and filtration by extraction.

Preferably, the production method of the present embodiment further comprises the following step (5): step (5) of supplying the component (B1) to the step (1).

The step (5) allows the purified diol (B1) to be recycled in polyester resin production. The purified diol (B1) can be recycled by a method using the purified diol (B1) as the diol (B) having no cyclic acetal skeleton for use in the reaction of the step (1). For example, in the step (1-i), the purified diol (B1) can be used as the diol (B) having no cyclic acetal skeleton for esterification reaction with the dicarboxylic acid (G) or as the diol (B) having no cyclic acetal skeleton for the depolymerization reaction of the dihydroxyester (F1-2'). In the step (1-iii), the purified diol (B1) can be used as the diol (B) having no cyclic acetal skeleton for transesterification reaction with the dicarboxylic acid dialkyl ester (E). In the polyester resin production according to the present embodiment using the purified diol (B1), the obtained polyester resin can have equivalent quality and properties and also improved productivity, compared with a polyester resin produced without the use of the purified diol (B1) as the diol (B) having no cyclic acetal skeleton.

Preferably, the polyester resin obtained by the production method of the present embodiment has a unit derived from any compound represented by the above formula (2) or (3) as the diol unit having a cyclic acetal skeleton. The diol unit having a cyclic acetal skeleton is more preferably a unit derived from 3,9-bis(1,1-dimethyl-2-hydroxyethyl)-2,4,8,10-tetraoxaspiro[5.5]undecane or 5-methylol-5-ethyl-2-(1,1-dimethyl-2-hydroxyethyl)-1,3-dioxane. The polyester resin having such a structure has further enhanced mechanical properties. In addition, the polyester resin obtained by the production method of the present embodiment is particularly excellent in transparency and heat resistance.

EXAMPLES

Hereinafter, the present invention will be described more specifically with reference to Examples. However, the scope of the present invention is not intended to be limited by these Examples. Evaluation methods were conducted as follows:

[Evaluation of Polyester Resin]
(1) Number-Average Molecular Weight and Molecular Weight Distribution (Mw/Mn)

2 mg of each polyester resin was dissolved in 20 g of chloroform, and this solution was used as a sample. The weight of this sample was measured by gel permeation chromatography (GPC) and calibrated using standard polystyrene to determine a number-average molecular weight (Mn). Then, the molecular weight distribution (Mw/Mn) was determined from the number-average molecular weight (Mn) and the weight-average molecular weight (Mw).

In GPC, "TOSOH 8020" (manufactured by Tosoh Corp.) equipped with two columns "TSK GMHHR-L" (manufactured by Tosoh Corp.) and one column "TSK G5000HR" (manufactured by Tosoh Corp.) was used. The column temperature was set to 40° C. Chloroform was injected as an eluent to the column at a flow rate of 1.0 mL/min, and the measurement was conducted using a UV detector.

(2) Color Difference (L*, a*, and b*)

In polyester resin production mentioned later, each resin after reaction was isolated in a strand (diameter: 3 mm) form from the nozzle of the bottom vent valve of the reaction vessel and cut into a length of 3 mm to 4 mm. 5.8 g of the cut strand was added to a round cell (diameter: 30 mm, height: 15 mm, thickness: 2 mm) and used as a sample. This sample was assayed under conditions involving 23° C. and 50% relative humidity using a color difference meter ("Z-2000", manufactured by Nippon Denshoku Industries, Co., Ltd.) to determine L', a', and b' values.

(3) Copolymerization Rate of Diol Having Cyclic Acetal Skeleton

The copolymerization rate of diols having a cyclic acetal skeleton refers to the ratio of the amount of the diol units (A) having a cyclic acetal skeleton to the amount of the dicarboxylic acid units in a polyester resin (SPG copolymerization rate). 20 mg of each polyester resin was dissolved in 1 g of deuterated chloroform, and this solution was used as a sample. This sample was assayed by $^1$H-NMR. The copolymerization rate of diols having a cyclic acetal skeleton was calculated from the obtained peak area ratio. The measuring instrument used was "NM-AL400" (400 MHz) manufactured by JEOL Ltd.

(4) Glass Transition Temperature

Approximately 10 mg of each sample was placed in a non-sealed container made of aluminum and assayed under conditions involving a temperature rise rate of 20° C./min in a nitrogen gas (30 mL/min) stream using a differential scanning calorimeter ("DSC/TA-50WS") manufactured by Shimadzu Corp.

(5) Diol Concentration (Diethylene Glycol Concentration, Etc.)

The diol concentration (diethylene glycol concentration, etc.) refers to the ratio of the amount of the diol units (diethylene glycol, etc.) to the amount of the dicarboxylic acid units in a polyester resin. 20 mg of each polyester resin was dissolved in 1 g of deuterated chloroform, and this solution was used as a sample. This sample was assayed by $^1$H-NMR. The diol concentration of diols having a cyclic acetal skeleton was calculated from the obtained peak area ratio. The measuring instrument used was "NM-AL400" (400 MHz) manufactured by JEOL Ltd.

[Evaluation of Distillate and Mixed Solution (Mixture Containing a Plurality of Recovered Distillates)]
(1) Component and Quantitative Analysis 0.02 g of an internal standard was added to 1 g of each analyte (distillate or mixed solution), and this mixture was used as an assay sample. This sample was analyzed by gas chromatography (GC).

For an analyte in a slurry form, 0.5 g of tetrahydrofuran and 0.01 g of an internal standard were added to 0.5 g of the assay sample, and the resulting solution was used as an assay sample.

In GC, "6850" (detector: TCD, column: "DB-WAX") and "6890N" (detector: FID, column: "DB-1") manufactured by Agilent Technologies, Inc. were used.

(2) pH Measurement

The pH of each analyte (distillate or mixed solution) was measured using a pH meter. The pH meter used was "F-52" manufactured by HORIBA, Ltd. Electrodes were dipped in the distillate under atmospheric pressure for the measurement.

Example 1

Step 1; Step of Obtaining Dihydroxyester 275.7 g of terephthalic acid and 128.8 g of ethylene glycol were charged and subjected to esterification reaction by a routine method to obtain a polyester resin. To the obtained ester, 77.3 g of ethylene glycol for depolymerization and 43 mg of germanium dioxide were added to perform depolymerization at 225° C. under normal pressure. Generated water was distilled off, while the reaction was carried out for 1.5 hours. Then, ethylene glycol was distilled off from the reaction product over 1 hour by the heat treatment of the reaction product at 225° C. at 13.3 kPa for 1 hour to obtain a distillate (distillate (1)).

Step 2; Step of Obtaining Oligomer

Thereafter, 28 mg of tetra-n-butyl titanate, 236.4 g of 3,9-bis(1,1-dimethyl-2-hydroxyethyl)-2,4,8,10-tetraoxaspiro[5.5]undecane (hereinafter, also abbreviated to SPG), 33 mg of potassium acetate, and 151 mg of triethyl phosphate were added to the reaction product. A distillate (distillate (2)) was separated from the reaction product by heat treatment at 190° C. at 13.3 kPa for 1 hour, while the reaction was allowed to proceed.

Step 3; Polymerization Step

Thereafter, the reaction product was gradually heated, while the pressure was gradually reduced. Finally, polycondensation reaction was performed under conditions involving 280° C. and high vacuum (300 Pa or lower), while a distillate (distillate (3)) was separated from the reaction product. When the melt viscosity at 280° C. reached 120 Pa·s, the reaction was completed to obtain a polyester resin.

The distillates (1) to (3) were recovered and mixed to prepare a mixed solution. The mixed solution contained 94.0% by mass of ethylene glycol, 0.9% by mass of water, 1.6% by mass of diethylene glycol, 0.1% by mass of triethylene glycol, 1.5% by mass of SPG, and 0.17% by mass of 2-(1,1-dimethyl-2-hydroxyethyl)-1,3-dioxolane and was in the form of slurry containing white solids. This mixed solution had a pH of 2.80.

Step 4-1; Decomposition Step

This mixed solution was introduced into a reactor equipped with a three-necked flask (3 L), a packed tower-type rectifier, a partial condenser, a cold trap, a vacuum pump, a pressure reduction regulator, a stirring blade, and a mantle heater, and stirred at 170° C. under normal pressure for 2 hours to obtain a transparent yellow liquid. This yellow liquid contained 92.0% by mass of ethylene glycol, 0.8% by mass of water, 1.6% by mass of diethylene glycol, 0.1% by mass of triethylene glycol, 0.02% by mass of SPG, 1.3% by mass of 2-(1,1-dimethyl-2-hydroxyethyl)-1,3-dioxolane, 0.4% by mass of pentaerythritol, and 0.3% by mass of dioxanetriol. The decomposition rate of SPG was 99.0%. This decomposition rate was calculated according to the following expression:

Decomposition rate=100−[(Mass of SPG contained in the liquid after heat treatment)/(Mass of SPG contained in the starting material solution before heat treatment)×100].

Step 4-2; Step of Obtaining Purified Diol

Subsequently, this yellow liquid was totally refluxed for 1 hour under conditions involving 110 to 120° C. and 4 kPa using the above-mentioned reactor to remove water and components having low boiling point. Then, a portion of the distillate was brought back as a refluxed solution into the distillation column under conditions involving 125 to 135° C. and 4 kPa, while a clear colorless purified diol (hereinafter, referred to as purified EG) was obtained over 4.5 hours. This purified EG contained 98.1% by mass of ethylene glycol, 0.03% by mass of water, and 1.8% by mass of 2-(1,1-dimethyl-2-hydroxyethyl)-1,3-dioxolane, but had an SPG concentration equal to or lower than the detection limit (1 ppm).

Step 5

275.7 g of terephthalic acid, 87.1 g of purified EG described above, and 41.7 g of ethylene glycol were charged and subjected to esterification reaction by a routine method to obtain an ester. To the obtained ester, 77.3 g of purified EG and 43 mg of germanium dioxide were further added to perform depolymerization at 225° C. under normal pressure. Generated water was distilled off from the reaction product, while the reaction was further carried out for 1.5 hours. Then, ethylene glycol was distilled off from the reaction product by heat treatment at 225° C. at 13.3 kPa for 1 hour. Thereafter, 28 mg of tetra-n-butyl titanate, 236.4 g of SPG, 33 mg of potassium acetate, and 151 mg of triethyl phosphate were added to the reaction product, followed by reaction at 190° C. at 13.3 kPa for 1 hour. Thereafter, the reaction product was gradually heated, while the pressure was gradually reduced. Finally, polycondensation reaction was performed under conditions involving 280° C. and high vacuum (300 Pa or lower). When the melt viscosity at 280° C. reached 120 Pa·s, the reaction was completed to obtain a polyester resin. The obtained polyester resin had a number-average molecular weight (Mn) of 15000, a molecular weight distribution (Mw/Mn) of 3.6, a glass transition temperature of 109° C., a diethylene glycol concentration of 2.7% by mol, and an SPG copolymerization rate of 45.6% by mol. The polyester resin had an L* value of 62.3, an a* value of −1.0, and a b* value of 0.4.

Reference Example 1

275.7 g of terephthalic acid and 128.8 g of ethylene glycol were charged and subjected to esterification reaction by a routine method. To the obtained ester, 77.3 g of ethylene glycol for depolymerization and 43 mg of germanium dioxide were added to perform depolymerization at 225° C. under normal pressure. Generated water was distilled off, while the reaction was carried out for 1.5 hours. Then, ethylene glycol was distilled off from the reaction product by heat treatment at 225° C. at 13.3 kPa for 1 hour.

Thereafter, 28 mg of tetra-n-butyl titanate, 236.4 g of 3,9-bis(1,1-dimethyl-2-hydroxyethyl)-2,4,8,10-tetraoxaspiro[5.5]undecane, 33 mg of potassium acetate, and 151 mg of triethyl phosphate were added to the reaction product. A distillate was separated from the reaction product by heat treatment at 190° C. at 13.3 kPa for 1 hour.

Thereafter, the reaction product was gradually heated, while the pressure was gradually reduced. Finally, polycondensation reaction was performed under conditions involving 280° C. and high vacuum (300 Pa or lower), while a distillate was distilled off from the reaction product. When the melt viscosity at 280° C. reached 120 Pa·s, the reaction was completed to obtain a polyester resin.

The obtained polyester resin had a number-average molecular weight (Mn) of 13500, a molecular weight distribution (Mw/Mn) of 3.5, a glass transition temperature of 109° C., a diethylene glycol concentration of 1.5% by mol, and an SPG copolymerization rate of 45.9%. The polyester resin had an L* value of 54.4, an a* value of −0.3, and a b* value of 1.4.

Comparative Example 1

Steps 1 to 3

The steps 1, 2, and 3 were performed in the same way as in Example 1. Distillates (1) to (3) were recovered in the steps 1 to 3 and mixed to prepare a mixed solution.

Step 4-1

The mixed solution was pH-adjusted to 11.33 by the addition of an aqueous solution containing 10% by mass of sodium hydroxide to the mixed solution. This mixed solution having a pH of 11.33 was introduced into the same reactor as in Example 1 (reactor equipped with a three-necked flask (3 L), a packed tower-type rectifier, a partial condenser, a cold trap, a vacuum pump, a pressure reduction regulator, a stirring blade, and a mantle heater) and stirred at 170° C. under normal pressure for 15 hours to obtain slurry containing white solids. This slurry contained 95.0% by mass of ethylene glycol, 1.0% by mass of water, 1.6% by mass of diethylene glycol, 0.06% by mass of triethylene glycol, 1.1% by mass of SPG, 0.2% by mass of 2-(1,1-dimethyl-2-hydroxyethyl)-1,3-dioxolane, 0.03% by mass of pentaerythritol, and 0.03% by mass of dioxanetriol and had an SPG decomposition rate of 3.8%.

Step 4-2

Subsequently, this slurry was totally refluxed for 1 hour under conditions involving 110 to 120° C. and 4 kPa using the same reactor as in Example 1 to remove water and components having low boiling point. Then, a portion of the distillate was brought back as a refluxed solution into the distillation column under conditions involving 125 to 135° C. and 4 kPa, while a clear colorless purified diol (purified EG) was obtained over 4.5 hours. This purified diol contained 98.1% by mass of ethylene glycol, 0.06% by mass of water, 0.1% by mass of SPG, and 1.5% by mass of 2-(1,1-dimethyl-2-hydroxyethyl)-1,3-dioxolane.

Step 5

275.7 g of terephthalic acid and 128.8 g of purified EG were charged and subjected to esterification reaction by a routine method. To the obtained ester, 77.3 g of purified EG and 43 mg of germanium dioxide were added to perform depolymerization at 225° C. under normal pressure. Generated water was distilled off from the reaction product, while the reaction was further carried out for 1.5 hours. Then, ethylene glycol was distilled off from the reaction product by heat treatment at 225° C. at 13.3 kPa for 1 hour. Thereafter, 28 mg of tetra-n-butyl titanate, 236.4 g of SPG, 33 mg of potassium acetate, and 151 mg of triethyl phosphate were added to the reaction product, followed by reaction at 190° C. at 13.3 kPa for 1 hour. Thereafter, the reaction product was gradually heated, while the pressure was gradually reduced. Finally, polycondensation reaction was performed under conditions involving 280° C. and high vacuum (300 Pa or lower). When the melt viscosity at 280° C. reached 120 Pa·s, the reaction was completed to obtain a polyester resin. The obtained polyester resin had a number-average molecular weight (Mn) of 13000, a molecular weight distribution (Mw/Mn) of 5.4, a glass transition temperature of 104° C., a diethylene glycol concentration of 2.4% by mol, and an SPG copolymerization rate of 45.2% by mol. The polyester resin had an L* value of 55.3, an a* value of −1.5, and a b* value of 3.8.

Comparative Example 2

Steps 1 to 3

The steps 1, 2, and 3 were performed in the same way as in Example 1. Distillates (1) to (3) were recovered in the steps 1 to 3 and mixed to prepare a mixed solution (hereinafter, referred to as unpurified EG).

Step 5

275.7 g of terephthalic acid and 128.8 g of unpurified EG were charged and subjected to esterification reaction by a routine method. To the obtained ester, 77.3 g of unpurified EG and 43 mg of germanium dioxide were further added to perform depolymerization at 225° C. under normal pressure. Generated water was distilled off from the reaction product, while the reaction was further carried out for 1.5 hours. Then, ethylene glycol was distilled off from the reaction product by heat treatment at 225° C. at 13.3 kPa for 1 hour. Thereafter, 28 mg of tetra-n-butyl titanate, 236.4 g of SPG, 33 mg of potassium acetate, and 151 mg of triethyl phosphate were added to the reaction product, followed by reaction at 190° C. at 13.3 kPa for 1 hour. Thereafter, the reaction product was gradually heated, while the pressure was gradually reduced. Finally, polycondensation reaction was performed under conditions involving 280° C. and high vacuum (300 Pa or lower). When the melt viscosity at 280° C. reached 120 Pa·s, the reaction was completed to obtain a polyester resin. The obtained polyester resin had a number-average molecular weight Mn of 11500, a molecular weight distribution (Mw/Mn) of 5.2, a glass transition temperature of 105° C., a diethylene glycol concentration of 2.2% by mol, and an SPG copolymerization rate of 46.0% by mol. The polyester resin had an L* value of 59.5, an a value of −1.4, and a b value of 3.5.

Comparative Example 3

Steps 1 to 3

The steps 1, 2, and 3 were performed in the same way as in Example 1. Distillates (1) to (3) were recovered in the steps 1 to 3 and mixed to prepare a mixed solution.

Step 4-1

The mixed solution was introduced into the same reactor as in Example 1 (reactor equipped with a three-necked flask (3 L), a packed tower-type rectifier, a partial condenser, a cold trap, a vacuum pump, a pressure reduction regulator, a stirring blade, and a mantle heater) and stirred at 170° C. under normal pressure for 2 hours to obtain a transparent yellow liquid (hereinafter, referred to as heat-treated EG).

Step 5

275.7 g of terephthalic acid and 128.8 g of heat-treated EG were charged and subjected to esterification reaction by a routine method. To the obtained ester, 77.3 g of heat-treated EG and 43 mg of germanium dioxide were added to perform depolymerization at 225° C. under normal pressure. Generated water was distilled off from the reaction product, while the reaction was further carried out for 1.5 hours. Then, ethylene glycol was distilled off by heat treatment at 225° C. at 13.3 kPa for 1 hour. Thereafter, 28 mg of tetra-n-butyl titanate, 236.4 g of 3,9-bis(1,1-dimethyl-2-hydroxyethyl)-2,4,8,10-tetraoxaspiro[5.5]undecane, 33 mg of potassium acetate, and 151 mg of triethyl phosphate were added to the reaction product, followed by reaction at 190° C. at 13.3 kPa for 1 hour. Thereafter, the reaction product was gradually heated, while the pressure was gradually reduced. Finally, polycondensation reaction was performed under conditions involving 280° C. and high vacuum (300 Pa or lower). When the melt viscosity at 280° C. reached 120 Pa·s, the reaction was completed to obtain a polyester resin. The obtained polyester resin had a number-average molecular weight (Mn) of 11000, a molecular weight distribution (Mw/Mn) of 5.4, a glass transition temperature of 104° C., a diethylene glycol concentration of 2.3% by mol, and an SPG copolymerization rate of 45.7% by mol. The polyester resin had an L* value of 58.0, an a* value of −1.2, and a b* value of 3.9.

Comparative Example 4

Steps 1 to 3

The steps 1, 2, and 3 were performed in the same way as in Example 1. Distillates (1) to (3) were recovered in the steps 1 to 3 and mixed to prepare a mixed solution.

Step 4-2

The mixed solution was introduced into the same reactor as in Example 1 (reactor equipped with a three-necked flask (3

L), a packed tower-type rectifier, a partial condenser, a cold trap, a vacuum pump, a pressure reduction regulator, a stirring blade, and a mantle heater) and totally refluxed for 1 hour under conditions involving 110 to 120° C. and 4 kPa to remove water and components having low boiling point. A portion of the distillate was further brought back as a refluxed solution into the distillation column under conditions involving 125 to 135° C. and 4 kPa, while a clear colorless purified diol was obtained over 4.5 hours. This purified diol contained 98.0% by mass of ethylene glycol, 0.05% by mass of water, 0.1% by mass of SPG, and 1.7% by mass of 2-(1,1-dimethyl-2-hydroxyethyl)-1,3-dioxolane.

Step 5

275.7 g of terephthalic acid and 128.8 g of the purified diol obtained above were charged and subjected to esterification reaction by a routine method. To the obtained ester, 77.3 g of the purified diol obtained above and 43 mg of germanium dioxide were added to perform depolymerization at 225° C. under normal pressure. Generated water was distilled off from the reaction product, while the reaction was further carried out for 1.5 hours. Then, ethylene glycol was distilled off from the reaction product by heat treatment at 225° C. at 13.3 kPa for 1 hour. Thereafter, 28 mg of tetra-n-butyl titanate, 236.4 g of 3,9-bis(1,1-dimethyl-2-hydroxyethyl)-2,4,8,10-tetraoxaspiro[5.5]undecane, 33 mg of potassium acetate, and 151 mg of triethyl phosphate were added to the reaction product, followed by reaction at 190° C. at 13.3 kPa for 1 hour. Thereafter, the reaction product was gradually heated, while the pressure was gradually reduced. Finally, polycondensation reaction was performed under conditions involving 280° C. and high vacuum (300 Pa or lower). When the melt viscosity at 280° C. reached 120 Pa·s, the reaction was completed to obtain a polyester resin. The obtained polyester resin had a number-average molecular weight (Mn) of 13500, a molecular weight distribution (Mw/Mn) of 4.6, a glass transition temperature of 105° C., a diethylene glycol concentration of 2.2% by mol, and an SPG copolymerization rate of 45.5% by mol. The polyester resin had an L* value of 58.2, an a value of −1.1, and a b* value of 3.1.

The results of Example 1, Reference Example 1, and Comparative Examples 1 to 4 are shown in Table 1.

The present application is based on Japanese Patent Application No. 2012-123137 filed on May 30, 2012 in the Japan Patent Office. The contents thereof are incorporated herein by reference.

The invention claimed is:

1. A method for producing a polyester resin comprising a dicarboxylic acid unit and a diol unit, wherein at least a portion of the diol unit is a diol unit having a cyclic acetal skeleton, the method comprising the following steps (1) to (4-2):

step (1) of reacting any one or more compounds selected from the group consisting of a dicarboxylic acid (G), a polyester resin comprising a dicarboxylic acid (G) and a diol (B) having no cyclic acetal skeleton, and a dicarboxylic acid dialkyl ester (E), with a diol (B) having no cyclic acetal skeleton to obtain a dihydroxyester (F) represented by the following formula (1);

step (2) of subjecting the dihydroxyester (F) to transesterification reaction with a diol (A) having a cyclic acetal skeleton to obtain an oligomer;

step (3) of polymerizing the oligomer;

step (4-1) of distilling off a diol mixture (C) comprising the component (B) and/or the component (A) in the step (2) and/or the step (3), and decomposing the component (C) under a pH condition of 10 or lower such that a concentration of the component (A) in the component (C) is 0.5% by mass or lower; and step (4-2) of distilling the component (C) after the step (4-1) to obtain a purified diol (B1) comprising the component (B):

[Formula 1]

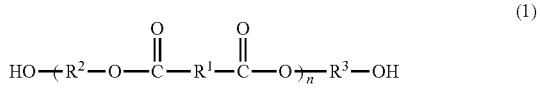

(wherein $R^1$, $R^2$, and $R^3$ each independently represent any divalent substituent selected from the group consisting of an aliphatic hydrocarbon group having 1 to 10 carbon atoms, an alicyclic hydrocarbon group having 3 to 10 carbon atoms, and an aromatic hydrocarbon group having 6 to 10 carbon atoms; and n is 1 or more and 200 or less).

TABLE 1

|  | Example 1 | Reference Example 1 | Comparative Example 1 | Comparative Example 2 | Comparative Example 3 | Comparative Example 4 |
| --- | --- | --- | --- | --- | --- | --- |
| Mn | 15000 | 13500 | 13000 | 11500 | 11000 | 13500 |
| Mw/Mn | 3.6 | 3.5 | 5.4 | 5.2 | 5.4 | 4.6 |
| L* | 62.3 | 54.4 | 55.3 | 59.5 | 58.0 | 58.2 |
| a* | −1.0 | −0.3 | −1.5 | −1.4 | −1.2 | −1.1 |
| b* | 0.4 | 1.4 | 3.8 | 3.5 | 3.9 | 3.1 |
| Tg (° C.) | 109 | 109 | 104 | 105 | 104 | 105 |
| DEG concentration (mol %) | 2.7 | 1.5 | 2.4 | 2.2 | 2.3 | 2.2 |
| SPG copolymerization rate (mol %) | 45.6 | 45.9 | 45.2 | 46.0 | 45.7 | 45.5 |

DEG: diethylene glycol
SPG: 3,9-bis(1,1-dimethyl-2-hydroxyethyl)-2,4,8,10-tetraoxaspiro[5.5]undecane These results demonstrated at least the production method of Example 1 can efficiently purify diols in the reaction system and can further produce a polyester resin having excellent properties.

2. The method for producing the polyester resin according to claim 1, further comprising the following step (5):

step (5) of supplying the component (B1) to the step (1).

3. The method for producing the polyester resin according to claim 1, wherein the decomposition in the step (4-1) is a heat treatment.

4. The method for producing the polyester resin according to claim 3, wherein the heat treatment is performed under a condition where the component (C) is kept at 80 to 250° C. for 1 to 20 hours.

5. The method for producing the polyester resin according to claim 1, wherein $R^2$ and $R^3$ in the formula (1) each independently represent an aliphatic hydrocarbon group having 1 to 10 carbon atoms.

6. The method for producing the polyester resin according to claim 1, wherein $R^1$ in the formula (1) is a group derived from any compound selected from the group consisting of terephthalic acid, isophthalic acid, and 2,6-naphthalenedicarboxylic acid.

7. The method for producing the polyester resin according to claim 1, wherein the diol unit having a cyclic acetal skeleton is a unit derived from any compound represented by the following formula (2):

[Formula 2]

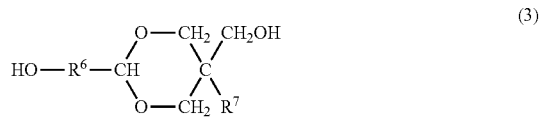

(2)

(wherein $R^4$ and $R^5$ each independently represent any divalent substituent selected from the group consisting of an aliphatic hydrocarbon group having 1 to 10 carbon atoms, an alicyclic hydrocarbon group having 3 to 10 carbon atoms, and an aromatic hydrocarbon group having 6 to 10 carbon atoms) or the following formula (3):

[Formula 3]

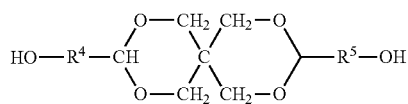

(3)

(wherein $R^6$ represents any divalent substituent selected from the group consisting of an aliphatic hydrocarbon group having 1 to 10 carbon atoms, an alicyclic hydrocarbon group having 3 to 10 carbon atoms, and an aromatic hydrocarbon group having 6 to 10 carbon atoms; and $R^7$ represents any monovalent substituent selected from the group consisting of an aliphatic hydrocarbon group having 1 to 10 carbon atoms, an alicyclic hydrocarbon group having 3 to 10 carbon atoms, and an aromatic hydrocarbon group having 6 to 10 carbon atoms).

8. The method for producing the polyester resin according to claim 7, wherein the diol unit having a cyclic acetal skeleton is a unit derived from 3,9-bis(1,1-dimethyl-2-hydroxyethyl)-2,4,8,10-tetraoxaspiro[5.5]undecane or 5-methylol-5-ethyl-2-(1,1-dimethyl-2-hydroxyethyl)-1,3-dioxane.

* * * * *